United States Patent
Iso et al.

(10) Patent No.: US 7,160,571 B2
(45) Date of Patent: Jan. 9, 2007

(54) METHOD OF MANUFACTURING A MAGNETIC RECORDING MEDIUM

(75) Inventors: Akira Iso, Nagano (JP); Hiroyuki Uwazumi, Nagano (JP); Takahiro Shimizu, Nagano (JP); Naoki Takizawa, Nagano (JP); Miyabi Nakamura, Ibaragi (JP)

(73) Assignee: Fuji Electric Co., Ltd., Kawasaki (JP)

( * ) Notice: Subject to any disclaimer, the term of this patent is extended or adjusted under 35 U.S.C. 154(b) by 0 days.

(21) Appl. No.: 10/915,565

(22) Filed: Aug. 11, 2004

(65) Prior Publication Data

US 2005/0008773 A1    Jan. 13, 2005

Related U.S. Application Data

(62) Division of application No. 10/324,105, filed on Dec. 20, 2002, now abandoned.

(30) Foreign Application Priority Data

Dec. 25, 2001    (JP) .............................. 2001-392508

(51) Int. Cl.
*B05D 5/12*    (2006.01)
(52) U.S. Cl. ..................... 427/127; 427/128; 427/132; 428/694 T
(58) Field of Classification Search ................ 427/127, 427/128, 132; 428/694 T
See application file for complete search history.

(56) References Cited

U.S. PATENT DOCUMENTS

| | | | |
|---|---|---|---|
| 4,833,020 A | 5/1989 | Shiroishi et al. | |
| 5,147,732 A | 9/1992 | Shiroishi et al. | |
| 5,683,561 A * | 11/1997 | Hollars et al. | 204/298.25 |
| 5,750,230 A | 5/1998 | Ishikawa et al. | |
| 5,815,343 A | 9/1998 | Ishikawa et al. | |
| 6,544,672 B1 * | 4/2003 | Futamoto et al. | 428/832 |
| 2002/0080520 A1 * | 6/2002 | Futamoto et al. | 360/97.01 |
| 2002/0141104 A1 | 10/2002 | Sato et al. | |

FOREIGN PATENT DOCUMENTS

| | | |
|---|---|---|
| JP | 63-220418 | 9/1988 |
| JP | 1-253816 | 10/1989 |
| JP | 03005918 | 1/1991 |
| JP | 2000-057569 | 2/2000 |
| JP | 2001-034925 | 2/2001 |
| JP | 2001-176059 | 6/2001 |
| JP | 2001-236636 | 8/2001 |

OTHER PUBLICATIONS

Japanese Patent Office Action for corresponding Japanese Patent Application No. 2001-392508 dated Apr. 14, 2006.
U.S. Appl. No. 10/317,221, filed Dec. 12, 2002, Takaaki Oikawa et al., Fuji Electric Co., Ltd.
U.S. Appl. No. 10/319,842, filed Dec. 16, 2002, Miyabi Nakamura et al., Fuji Electric Co., Ltd.

* cited by examiner

*Primary Examiner*—Alain L. Bashore
(74) *Attorney, Agent, or Firm*—Staas & Halsey LLP

(57) ABSTRACT

A method of manufacturing a magnetic recording medium facilitates preventing a film inflation from occurring in an environmental condition range between −40° C. and 80° C. and an 80% relative humidity. The magnetic recording medium includes a plastic substrate and an undercoating layer on the plastic substrate. The undercoating layer is provided with a columnar structure, which prevents water (moisture) between the plastic substrate and the undercoating layer from aggregating and, therefore, the film inflation from occurring.

7 Claims, 1 Drawing Sheet

METHOD OF MANUFACTURING A MAGNETIC RECORDING MEDIUM

CROSS-REFERENCE TO RELATED APPLICATIONS

This application is a Divisional Application of application Ser. No. 10/324,105, filed Dec. 20, 2002 now abandoned. This application claims the benefit of U.S. application Ser. No. 10/324, 105, filed Dec. 20, 2002 and Japanese Application No. 2001-392508, filed Dec. 25, 2001, in the Japanese Patent Office, the disclosures of which are incorporated herein by reference.

BACKGROUND OF THE INVENTION

1. Field of the Invention

The present invention relates to a magnetic recording medium mounted on an external storage of a computer such as a magnetic storage, a method of manufacturing the magnetic recording medium, and the magnetic storage using the magnetic recording medium.

2. Description of the Related Art

When realizing magnetic recording media exhibiting a high recording density and compatibility with a low-floating-height magnetic head, various compositions and structures have been proposed for a magnetic layer of the magnetic recording media, as well as various materials for a nonmagnetic undercoating layer and various materials for a nonmagnetic substrate. Although aluminum and glass are the main materials for the nonmagnetic substrate at present, a polymer resin substrate, a so-called plastic substrate, has been proposed recently for the nonmagnetic substrate.

To facilitate a lower-height floating of the magnetic head so that the high recording density realized in the magnetic recording media may be fully utilized, the magnetic recording media needs to be used reliably for a long time in various environments. The magnetic recording media is also applied in digital household appliances to be used reliably for a long time. The conditions, under which the magnetic recording media are expected to be useful, extend from very cold −40° C. to very hot and humid 80° C. and 80% of relative humidity. Some household appliance makers require that the magnetic recording media work normally for five years under conditions described above. It is necessary that the magnetic recording media for the household appliances be manufactured with low costs. Although the polymer resin substrate may be used for the substrate of the magnetic recording media, film inflation (a kind of layer parting) may occur in the magnetic recording media including the polymer resin substrate.

In view of the foregoing, according to an aspect of the present invention, a magnetic recording medium is provided, which obviates the problems described above. It is another aspect of the present invention to provide a method of manufacturing the magnetic recording medium and the magnetic storage mounting the magnetic recording medium thereon.

SUMMARY OF THE INVENTION

Various aspects and advantages of the invention will be set forth in part in the description that follows and, in part, will be obvious from the description, or may be learned by practice of the invention.

Typically, an undercoating layer is formed on a plastic substrate or an intermediate layer is formed below a magnetic layer to improve electromagnetic conversion characteristics of a magnetic recording medium. Film inflation is prevented from occurring by controlling a structure of the undercoating layer or the intermediate layer. To control the layer structure, an appropriate material of the undercoating layer or the intermediate layer may be selected to control deposition conditions, especially a pressure, under which the undercoating layer or the intermediate layer is formed. Materials, which facilitate providing a columnar structure in a relatively wide pressure range, include Mo, CrW and NiP. TiW and Ru, which facilitate obtaining excellent electromagnetic conversion characteristics, provide the undercoating layer or the intermediate layer with the columnar structure, when the undercoating layer or the intermediate layer is formed under a high pressure.

The film inflation, which poses problems on the magnetic recording media including the plastic substrate, is caused by aggregation of water (moisture). It is possible to prevent water (moisture) from aggregating and the film inflation from occurring by controlling the structure of the undercoating layer or the intermediate layer.

According to a first aspect of the present invention, there is provided a magnetic recording medium including: a nonmagnetic substrate made of a polymer resin; a magnetic layer above the nonmagnetic substrate; a protection layer above the magnetic layer; and a liquid lubricant layer on the protection layer.

The magnetic recording medium further includes a nonmagnetic undercoating layer on the nonmagnetic substrate.

Furthermore, the nonmagnetic undercoating layer is a metal layer including Ru, Re, Os, or Mo, an alloy layer includes Ru, Re, Os, or Mo, an alloy layer includes W and one or more elements including Ti, Zr, or Cr, or an alloy layer including Ni and P.

According to a second aspect of the present invention, there is provided a method of manufacturing a magnetic recording medium including forming a TiW alloy undercoating layer under a pressure of 60 mTorr or higher, forming a CrW alloy undercoating layer under a pressure of 5 mTorr or higher, forming a metal undercoating layer including Ru, Re or Os as a main component thereof under the pressure of 60 mTorr or higher, forming an alloy undercoating layer including Ru, Re or Os as a main component thereof under the pressure of 60 mTorr or higher, forming a metal undercoating layer including Mo as a main component thereof under the pressure of 5 mTorr or higher, forming an alloy undercoating layer containing Mo as the main component thereof under the pressure of 5 mTorr or higher, or forming an NiP alloy undercoating layer under the pressure of 5 mTorr or higher.

The magnetic recording medium further includes an intermediate layer on the nonmagnetic undercoating layer.

The intermediate layer is a metal layer including Ru, Re, Os, or Mo, an alloy layer including Ru, Re, Os, or Mo, an alloy layer including W and one or more elements including Ti, Zr, or Cr, or an alloy layer including Ni and P.

According to a third aspect of the invention, there is provided a method of manufacturing a magnetic recording medium including forming a TiW alloy intermediate layer under a pressure of 60 mTorr or higher, forming a CrW alloy intermediate layer under a pressure of 5 mTorr or higher, forming a metal intermediate layer including Ru, Re or Os as a main component thereof under the pressure of 60 mTorr or higher, forming an alloy intermediate layer including Ru, Re or Os as a main component thereof under the pressure of 60 mTorr or higher, forming a metal intermediate layer including Mo as a main component thereof under the pressure of 5 mTorr or higher, forming an alloy intermediate layer including Mo as a main component thereof under the pressure of 5 mTorr or higher, or forming a NiP alloy intermediate layer under the pressure of 5 mTorr or higher.

According to a fourth aspect of the invention, there is provided a magnetic storage including the above described magnetic recording medium mounted thereon.

These together with other aspects and advantages which will be subsequently apparent, reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

These and other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
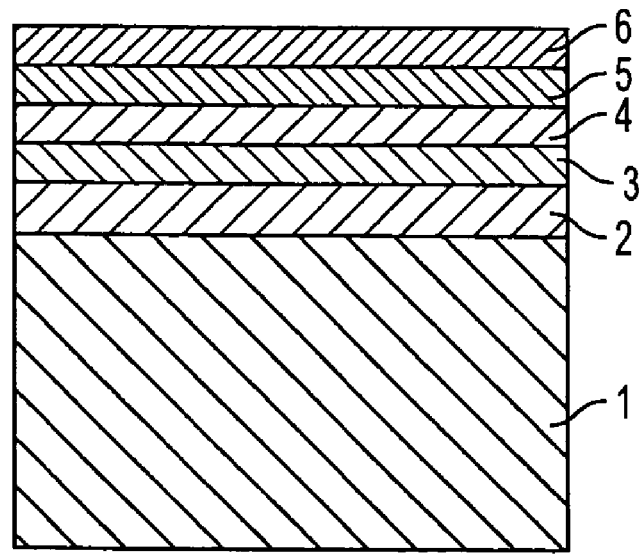
FIG. 1 is a cross sectional view of a magnetic recording medium, according to a first aspect or a second aspect of the present invention.

Reference will now be made in detail to the embodiments of the present invention, examples of which are illustrated in the accompanying drawings, wherein like reference numerals refer to like elements throughout. The embodiments are described below in order to explain the present invention by referring to the figures.

FIG. 1 is a cross sectional view of a magnetic recording medium, according to a first aspect or a second aspect of the present invention.

Referring now to FIG. 1, the magnetic recording medium, according to the first aspect, includes a laminate formed of a plastic substrate 1, an undercoating layer 2, a CoCrPt—SiO₂ layer 3, a Ti layer 4, a CN layer 5 and a lubricant layer 6. The undercoating layer 2 is formed by depositing a TiW layer, a CrW layer, a Mo layer or a NiP layer under a pressure between 5 mTorr and 30 mTorr. A thickness of the undercoating layer 2 is fixed at 10 nm. Then, environmental tests are conducted in a constant temperature oven to investigate whether film inflation occurs in the magnetic recording medium, according to the first aspect of the present invention. The magnetic recording medium is stored at first at a room temperature, then at 80° C. and 80% of relative humidity for 4 hours, then at −40° C. for 4 hours, and again at the room temperature. Then, the magnetic recording medium is observed under an optical microscope to find whether film inflation occurs. Table 1 lists the results.

TABLE 1

| Deposition conditions | Undercoating layers | | | |
|---|---|---|---|---|
| | TiW | CrW | Mo | NiP |
| 5 m Torr | x | o | o | o |
| 15 m Torr | x | o | o | o |
| 30 m Torr | x | o | o | o | o: Film inflation is not caused.
x: Film inflation is caused.

Observations in a transmission electron microscope have revealed that the CrW layer, the Mo layer, and the NiP layer have a columnar structure or a structure near to the columnar structure. The TiW layer does not have the columnar structure but has a uniform structure. In other words, the TiW layer does not have a distinctive structure. Film inflation is not caused when the CrW layer, the Mo layer, or the NiP layer is used for the undercoating layer 2. The film inflation occurs when the TiW layer is used for the undercoating layer 2.

Referring again to FIG. 1, the magnetic recording medium, according to the second aspect of the present invention, includes a laminate formed of the plastic substrate 1, the undercoating layer 2, the CoCrPt—SiO₂ layer 3, the Ti layer 4, the CN layer 5 and the lubricant layer 6. The undercoating layer 2 is formed by depositing the TiW layer, or a Ru layer under a pressure between 30 mTorr and 80 mTorr, according to the second aspect of the present invention. A thickness of the undercoating layer 2 is fixed at 10 nm. Then, environmental tests are conducted in the constant temperature oven to investigate whether the film inflation occurs in the magnetic recording medium, according to the second aspect of the present invention. The magnetic recording medium is stored at first at the room temperature, then at 80° C. and 80% of relative humidity for 4 hours, then at −40° C. for 4 hours, and again at the room temperature. Then, the magnetic recording medium is observed under an optical microscope to find whether film inflation occurs. Table 2 lists the results.

TABLE 2

| Deposition conditions | Undercoating layers | |
|---|---|---|
| | TiW | Ru |
| 30 m Torr | x | x |
| 45 m Torr | x | x |
| 60 m Torr | o | o |
| 80 m Torr | o | o | o: Film inflation is not caused.
x: Film inflation is caused.

Observations in a transmission electron microscope have revealed that the TiW layer and the Ru layer do not have the columnar structure when the TiW layer and the Ru layer are formed under a low pressure but have the columnar structure or a structure near to the columnar structure when the TiW layer and the Ru layer are formed under a high pressure. The film inflation occurs in the TiW layer and the Ru layer formed under a pressure of 60 mTorr or higher.

Figure 2:
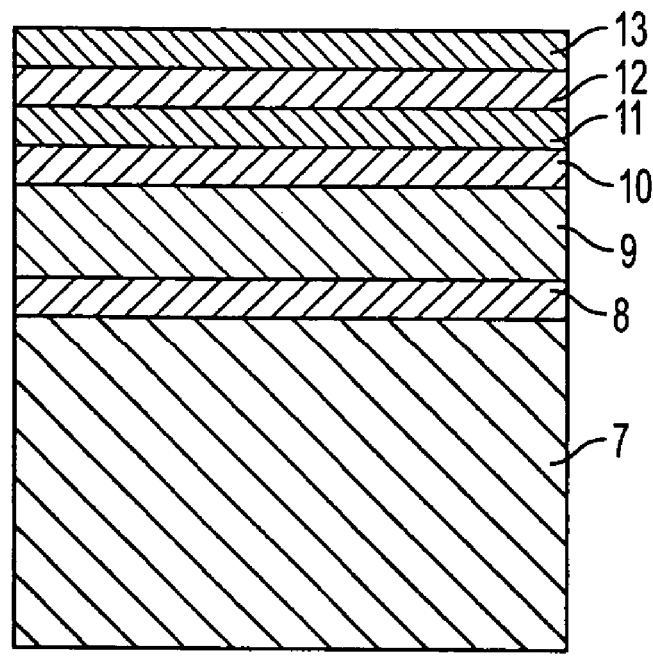
FIG. 2 is a cross sectional view of the magnetic recording medium, according to a third aspect of the present invention.

FIG. 2 is a cross sectional view of the magnetic recording medium according to a third aspect of the present invention.

Referring to FIG. 2, the magnetic recording medium, according to the third aspect of the present invention, includes a laminate formed of a plastic substrate 7, an undercoating layer 8, an intermediate layer 9, a CoCrPt—SiO₂ layer 10, a Ti layer 11, a CN layer 12 and a lubricant layer 13. The undercoating layer 8 is formed by depositing a TiW layer, or a CrW layer under a pressure of 30 mTorr. A thickness of the undercoating layer 8 is fixed at 10 nm. The intermediate layer 9 is formed by depositing the Ru layer at a pressure between 30 mTorr and 80 mTorr, according to the third aspect of the present invention. A thickness of the intermediate layer 9 is fixed at 20 nm. Then, environmental tests are conducted in the constant temperature oven to investigate whether the film inflation occurs in the magnetic recording medium, according to the third aspect of the present invention. The magnetic recording medium is stored at first at the room temperature, then at 80° C. and 80% of relative humidity for 4 hours, then at −40° C. for 4 hours, and again at the room temperature. Then, the magnetic recording medium is observed under the optical microscope to find whether the film inflation occurs. Table 3 lists the results.

TABLE 3

| Deposition conditions for the intermediate layers | Undercoating layers | |
|---|---|---|
| | CrW | TiW |
| 30 m Torr | x | x |
| 60 m Torr | o | x |
| 80 m Torr | o | x | o: Film inflation is not caused.
x: Film inflation is caused.

Observations in the transmission electron microscope have revealed that the CrW undercoating layer has the columnar structure. The TiW undercoating layer does not have the columnar structure but has the uniform structure. In other words, the TiW undercoating layer does not have the distinctive structure. The Ru intermediate layer formed under a pressure of 60 mTorr or higher has the columnar structure. When the undercoating layer and the intermediate layer have the respective columnar structures, the film inflation does not occur. When the undercoating layer or the intermediate layer does not have the columnar structure, film inflation occurs.

The magnetic recording medium as previously set forth, may be mounted in a magnetic storage. U.S. Publication No. US 2002/0141104 A1 titled "Servo Control Method and Servo Control System for Magnetic Disc Drive" to Sato et al., refers to incorporating the magnetic recording medium in the magnetic storage, description of which is incorporated herein by reference.

According to an aspect of the present invention, a magnetic recording medium, which does not cause film inflation in an environmental condition range between −40° C. and 80° C. and 80% of relative humidity, is obtained by providing an undercoating layer on a plastic substrate with a columnar structure.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of manufacturing a magnetic recording medium comprising a nonmagnetic substrate made of a polymer resin, a magnetic layer above the nonmagnetic substrate, a protection layer above the magnetic layer, and a liquid lubricant layer on the protection layer, the method comprising:

forming an undercoating layer on the nonmagnetic substrate between the nonmagnetic substrate and the magnetic layer under a pressure between approximately 30 mTorr and approximately 80 mTorr; and forming an intermediate layer on the undercoating layer under a pressure of 60 mTorr or higher.

2. The method according to claim 1, wherein the undercoating layer comprises a TiW alloy.

3. The method according to claim 1, wherein the undercoating layer comprises Ru, Re or Os as a component thereof.

4. The method according to claim 1 wherein the intermediate layer formed on the undercoating layer comprises a TiW alloy.

5. The method according to claim 1, wherein the intermediate layer comprises Ru, Re or Os as a component thereof.

6. A method of manufacturing a magnetic recording medium comprising a nonmagnetic substrate, a magnetic layer above the nonmagnetic substrate, a protection layer above the magnetic layer, and a liquid lubricant layer on the protection layer, the method comprising:

forming an undercoating layer on the nonmagnetic substrate under a pressure between approximately 30 mTorr and approximately 80 mTorr; and forming an intermediate layer on the undercoating layer under a pressure of 60 mTorr or higher.

7. A method of manufacturing a magnetic recording medium comprising a nonmagnetic substrate, an undercoating layer on the nonmagnetic substrate, a CoCrPt—$SiO_2$ layer above the undercoating layer, a Ti layer above the CoCrPt—$SiO_2$ layer, a CN layer above the Ti Layer, and a lubricant layer on the CN layer, the method comprising:

forming an undercoating layer on the nonmagnetic substrate between the nonmagnetic substrate and the CoCrPt—$SiO_2$ layer under a pressure between approximately 30 mTorr and approximately 80 mTorr; and forming an intermediate layer on the undercoating layer under a pressure of 60 mTorr or higher.

* * * * *